United States Patent [19]

Kraus

[11] Patent Number: 4,558,494

[45] Date of Patent: Dec. 17, 1985

[54] PLASTIC FASTENING COMPONENT

[75] Inventor: Willibald Kraus, Kaiserslautern, Fed. Rep. of Germany

[73] Assignee: TRW United-Carr GmbH, Frankfurt, Fed. Rep. of Germany

[21] Appl. No.: 621,319

[22] Filed: Jun. 15, 1984

[51] Int. Cl.$^4$ ............................................. F16L 3/22
[52] U.S. Cl. ..................................... 24/297; 24/292; 411/437; 248/73
[58] Field of Search ................. 24/297, 292, 573, 664; 411/436, 437; 248/73

[56] References Cited

U.S. PATENT DOCUMENTS

| | | | |
|---|---|---|---|
| 2,613,051 | 10/1952 | Baum | 248/73 |
| 2,632,479 | 3/1953 | Pfeil et al. | 411/437 |
| 3,230,592 | 1/1966 | Hosea | 24/297 |
| 3,313,083 | 4/1967 | Flora | 24/297 |
| 3,417,438 | 12/1968 | Schuplin | 248/73 |
| 3,433,119 | 3/1969 | Ballantyne et al. | 411/437 |
| 3,570,361 | 3/1971 | Tinnerman | 411/437 |
| 3,980,263 | 9/1976 | Okuda | 248/73 |
| 4,299,520 | 11/1981 | Iwata | 411/437 |

FOREIGN PATENT DOCUMENTS

| | | | |
|---|---|---|---|
| 3002031 | 7/1982 | Fed. Rep. of Germany | |
| 1216284 | 12/1970 | United Kingdom | 24/297 |
| 1239409 | 7/1971 | United Kingdom | 248/73 |
| 1296677 | 11/1972 | United Kingdom | 248/73 |

*Primary Examiner*—Victor N. Sakran
*Attorney, Agent, or Firm*—Daniel G. Blackhurst; Sol L. Goldstein

[57] ABSTRACT

The specification discloses a plastic component having a cylindrical connecting portion with a contoured interior space designed for acceptance of a threaded or profiled bolt or stud. The interior space is designed with resilient gripping members which are attached at one end to the walls of the interior space and protrude obliquely into the interior space. The members are designed to firmly grip the stud or bolt without undergoing permanent deformation or deforming the cylindrical connecting portion.

6 Claims, 4 Drawing Figures

PLASTIC FASTENING COMPONENT

The subject invention is directed to a plastic fastener component which is especially suited for use in mounting fuel line clamps to threaded studs in motor vehicles and will be described with particular reference thereto; however, as will become apparent, the component could be used for a variety of other purposes.

In the prior art there is already known a plastic fastening element which is designed to be axially driven onto a threaded or profiled stud. The element is designed to provide firm connection with the stud while permitting threaded removal. In this prior art fastener, the connecting section is an aperture which has longitudinally positioned ribs which protrude radially into the interior space (see for example, West German Pat. No. 3,002,031). With this known construction, there may result the disadvantage that following assembly with a threaded bolt, there is produced an undesired permanent deformation of the ribs and even the exterior diameter of the connecting section.

The purpose of this invention is to provide a plastic component of the above described type in which secure attachment of the plastic element to a threaded or profiled bolt can take place without causing permanent deformation of the exterior diameter of the element or the interior of the aperture.

This objective is solved according to the invention in that the interior of the aperture is provided with elastic and tiltable members. Because of the elastic tiltability of the members, it is assured that the members position themselves against the exterior surface of the stud to grip it firmly, without any deformation of the outside of the plastic component. In another design of the invention, the members in the interior space of the aperture are shaped as wings which are attached at one end to the walls of the interior space. These wings are resilient and protrude obliquely into the interior space. The wings may be designed so that they have an enlargement at their free end which protrudes into the interior space.

According to another aspect of the invention, all the wings can protrude obliquely in one direction into the interior space. According to another aspect, there is also the possibility that a first set of wings can protrude obliquely in one direction into the interior space, and a second set in another direction. The two sets can be arranged one after the other in axial direction of the interior space.

According to another more limited aspect of the invention, there can be a guiding cone at the entry to the aperture of the component. Between the guiding cone and the plastic component, there can be a lip seal.

Furthermore, there exists the possibility that the interior space, exhibits an inlet zone, so that when driving the plastic component upon the profile bolt, rapid and secure mounting is facilitated.

The above and other objects and advantages will become apparent from the following description when read in conjunction with the accompanying drawings wherein.

Figure 1:
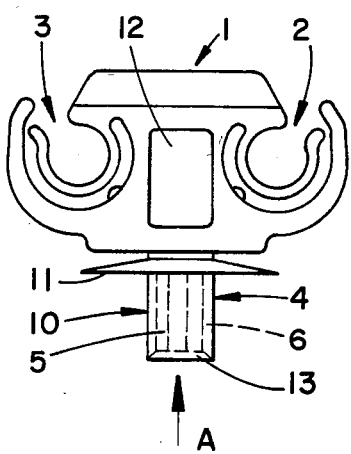
FIG. 1 is a lateral view of a plastic component incorporating the invention.

According to FIG. 1, the plastic component 1, which in this instance is designed as an attaching element for fuel or pipe lines in the motor vehicle industry, consists, in essence, of the two mounting devices 2 and 3 which are shaped for acceptance of pipe lines and, also of a connecting or fastening section 4. Section 4 is provided with an axially extending recess 12.

The section 4 is designed as a fastening cylinder 10. Between fastening cylinder 10 and attaching element 1 there is positioned a known radially extending lip seal 11.

Figure 2:
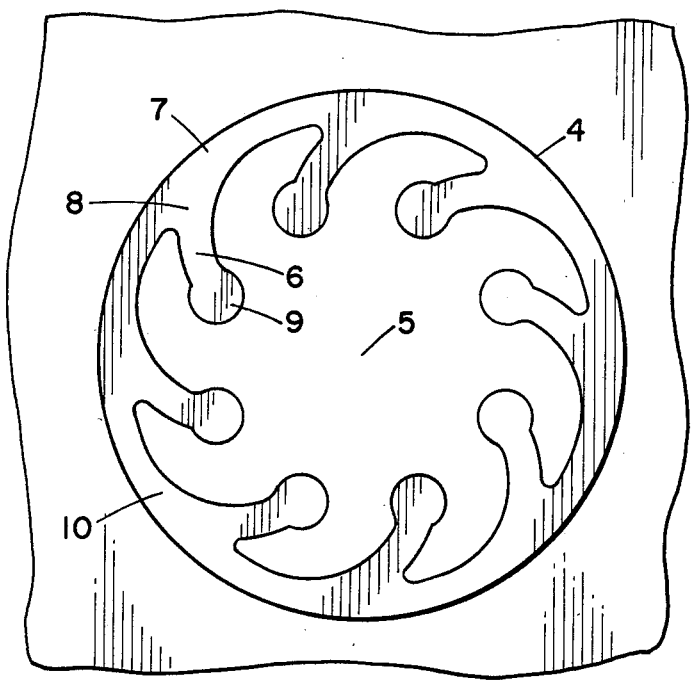
FIG. 2 is a view taken on line 2—2 of FIG. 1.

As can best be seen from FIG. 2, cylinder 10 defines the recess 12 and has an interior space 5. Extruding into space 5 are a plurality of fingers or wing-like members 6 which are attached at one end 8 at the interior walls 7 of fastening cylinder 10. They are preferably enlarged at their free end 9 and protrude into interior space 5. As is evident from FIG. 2, all members 6 protrude in one direction obliquely into the interior space 5. It is important to understand that the members 6 are shaped and configured so that they can move elastically in an arcuately tiltable path.

If the plastic component 1 is driven onto a threaded or profiled bolt or stud, the elastic and tiltable wing-like members 6 deflect outwardly to receive the stud and position themselves against the exterior surface of the bolt. The resilient nature of the members produces an excellent holding effect which resists axial movement of the component but permitts free threaded removal. The exterior diameter of cylinder 10 does not experience any undesirable or permanent deformation. Nevertheless, there exists a very secure attachment of the plastic component to the threaded bolt or stud.

While the invention has been described with reference to a component having a separate cylindrical fastening portion 10, it would, of course, be possible to eliminate portion 10 and provide recess 12 within plastic component 1. Such recess would, of course, include the members 6 having the characteristics described.

As is shown in FIG. 1, cylinder 10 preferably has at the inlet zone to interior space 5 a tapered or conically shaped entry zone 13. This assures rapid and functionally safe mounting when driving the component on a bolt or stud.

Figure 3:
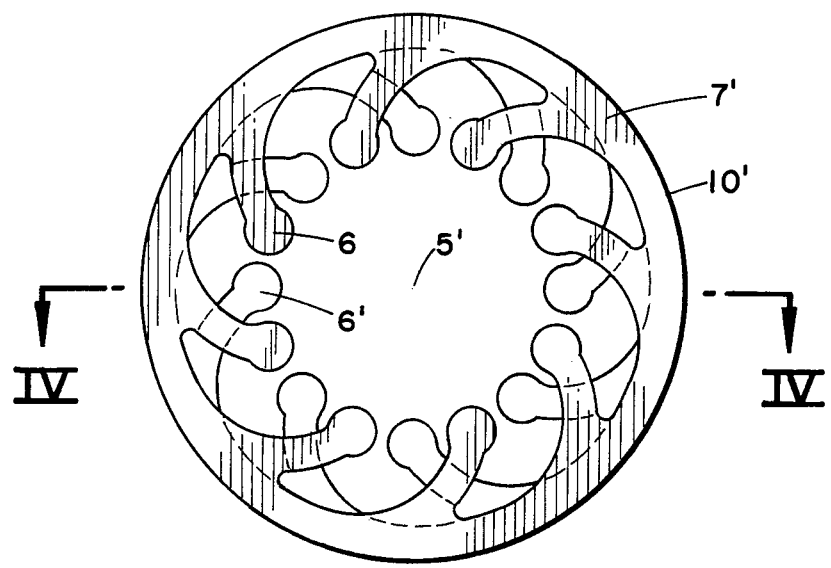
FIG. 3 is a view similar to FIG. 2 showing a modified form of the invention.
Figure 4:
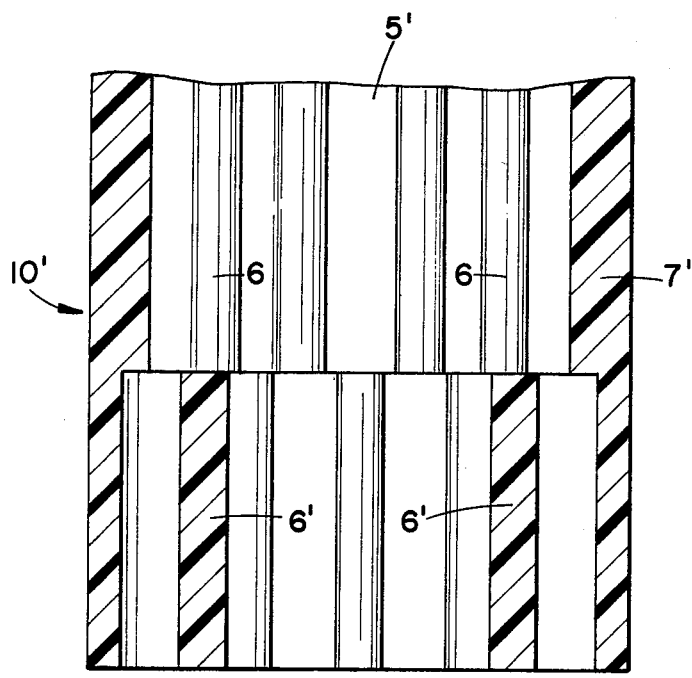
FIG. 4 is a partial sectional view taken on line 4—4 of FIG. 3.

For the modified design according to FIGS. 3 and 4, a number of wing-like members 6 are arranged to point in one direction and a second set of wing-like members 6' are arranged to point in another direction. Both sets protrude obliquely into interior space 5'. The end of wing-like members 6 and/or 6' are preferably formed integrally as a single piece with interior wall 7' of holding cylinder 10'. It is evident from FIG. 4 that wing-like members 6 protrude in one direction obliquely into the interior space. Wing-like members 6' are positioned behind and protrude obliquely in another direction into interior space 5'. On the basis of this construction, a further improvement in the holding effect is attained.

There also exists the possibility of positioning additional sets of members 6 in cylinder 10' to protrude obliquely into the interior space. That is, several alternating sets of members 6 could be used.

The invention with sloping and elastic wing-like members 6 and/or 6' in the interior space 5 and/or 5' is not limited to use in fastening elements for pipelines in the motor vehicle industry. Obviously, the design according to the invention could be applied to other plastic components, as for example mounting supports, spacers or adjusting devices.

Having thus described my invention, I claim:

1. A plastic fastening component for connection to a stud having a threaded exterior comprising a rigid wall connection part having an aperture sized for acceptance of the stud characterized in that the interior space of the aperture includes a plurality of arcuately shaped resilient gripping members which extend axially along the inside wall of the aperture, said gripping members being circumferentially aligned and projecting into the aperture so that axial insertion of said stud causes said gripping members to resiliently yield to the force of insertion, and grip the threaded exterior of the stud in a manner that permits removal thereof only by unthreading.

2. The plastic component according to claim 1, characterized in that gripping members have a wing-like configuration attached at one end to the interior walls of the aperture, and having a free end which extends obliquely into the aperture.

3. The plastic component according to claim 2, characterized in that the free end of the wing-like members are enlarged.

4. The plastic component according to claim 2, characterized in that all of the wing-like members extend generally in the same direction.

5. A plastic fastening component for connection to a stud having a threaded exterior comprising a rigid wall connection part having an aperture sized for acceptance of the stud characterized in that the interior space of the aperture includes a plurality of arcuately shaped resilient gripping members which extend axially along the inside wall of the aperture and being circumferentially aligned and projecting into the aperture, said members comprising at least two sets consecutively arranged in the axial direction with each set arcuately projecting in a different direction, so that axial insertion of said stud causes said gripping members to resiliently yield to the force of insertion to threadably grip said stud in a manner that permits removal thereof only by unthreading.

6. The plastic component according to one of the preceding claims, characterized in that the aperture includes a conical shaped inlet zone.

* * * * *